(No Model.)
W. DURYEA.
APPARATUS FOR DRYING THE BY PRODUCTS OF STARCH MANUFACTURE, AND OTHER VEGETABLE MATTERS.
No. 312,342. Patented Feb. 17, 1885.
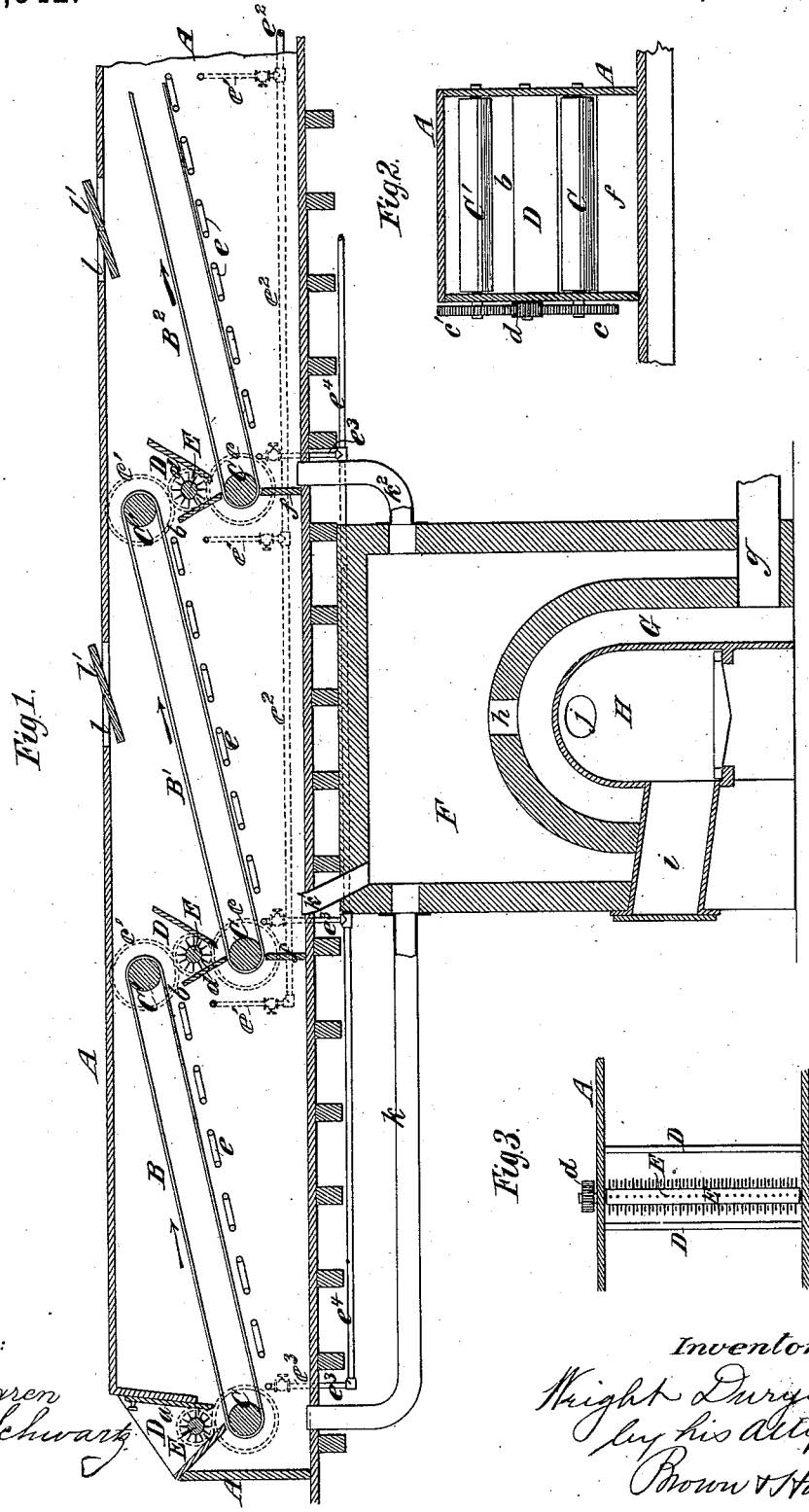

UNITED STATES PATENT OFFICE.

WRIGHT DURYEA, OF BROOKLYN, NEW YORK.

APPARATUS FOR DRYING THE BY-PRODUCTS OF STARCH-MANUFACTURE AND OTHER VEGETABLE MATTERS.

SPECIFICATION forming part of Letters Patent No. 312,342, dated February 17, 1885.

Application filed September 5, 1884. (No model.)

*To all whom it may concern:*

Be it known that I, WRIGHT DURYEA, of the city of Brooklyn, in the county of Kings and State of New York, have invented a new and useful Improvement in Apparatus for Drying the By-Products of Starch-Manufacture and other Vegetable Matters, of which the following is a specification.

My apparatus may be employed for drying any vegetable materials, but is especially useful in drying starch and refuse or by-products resulting from the manufacture of starch and glucose.

The invention relates to that class of apparatus in which is comprised a closed chamber or casing and a number or series of endless traveling aprons or carriers which convey the material to be dried through the chamber, and from one to another of which the material is delivered. In such apparatus are also comprised means for delivering dry and hot air into the chamber or inclosing casing of the apparatus and sometimes, also, steam-pipes, whereby the temperature of the air is maintained as nearly uniform as possible from the time it enters the chamber or casing till it makes its exit therefrom.

The invention consists in the combination, with a closed chamber or casing and a series of endless aprons or carriers arranged therein, one in advance of another, and preferably inclined so that the material is carried onward and upward by each apron, and by it delivered to the next apron, of means for supplying hot or dry air to said chamber or casing.

The invention also consists in the combination, with a closed chamber or casing and a series of endless aprons or carriers arranged therein, one in advance of another, as described, of means for causing a current of hot or dry air to pass lengthwise of the apparatus through the space between the head of each endless apron and the tail of the apron delivering material upon it, whereby the material falling from one apron to the next is met in its descent by the current of dry air, and is thus robbed of its moisture.

The invention also consists in the combination, with a chamber or casing and a series of endless aprons or carriers arranged therein, one in advance of another, as described, of a feeding-hopper at the receiving end or head of each endless apron, into which the material is delivered from the apron next behind, and a feeding roller or cylinder and breaker or stirrer arranged in the hopper, and serving by its rotation to break up or separate the particles of partly-dried material and prevent their agglomeration, and also serving to regulate and render uniform the feed or distribution of material onto the apron on which it delivers.

In connection with the foregoing arrangement of aprons, hoppers, and breaking and feeding cylinders, I provide means whereby currents of hot or dry air will be caused to pass lengthwise of the apparatus and across the tops of the above-described hoppers, whereby the drying material in falling from the aprons into the hoppers will be subjected to the currents of air which rob it of its moisture.

The invention also consists in other combinations of parts hereinafter described, and pointed out in the claims.

In the accompanying drawings I have represented an apparatus embodying my invention.

Figure 1 is a longitudinal section thereof. Fig. 2 is a transverse section thereof, and Fig. 3 is a plan of one of the hoppers and its breaking and feeding cylinders.

Similar letters of reference designate corresponding parts in all the figures.

A designates a long casing or chamber constructed in any suitable manner, and in which are arranged and operated a series of endless aprons or carriers arranged one in advance of the other, and here shown as each overlapping the next, so that material delivered on the head or receiving end of the first apron will be carried onward, and by it delivered to the head or receiving end of the next apron, and so on throughout the series. I have here shown only three aprons, B B' B², and have left the apparatus incomplete at the farther end for lack of space; but it will be readily understood that the remaining aprons of the series, be they few, many, or duplicates of those shown, and the appurtenances of each apron, are similar to those shown for each apron which I have represented. Each apron B, &c., is mounted on or carried by rollers or drums C C', and may consist of an endless belt of canvas or other woven fabric, or of wire-gauze of any desired degree of fineness. As here shown, the aprons are inclined upward in the direction of their movement, which is indicated by arrows, and at the head or receiving point of each apron, which is its lower end, is a hopper, D, wherein is arranged a driving roller or cylinder, E, which serves the double purpose of breaking up or stirring the partly-dried material to prevent its agglomeration, and of feeding or distributing the material to the apron, over which the hopper is placed. These results are secured by forming the drum or cylinder E with spikes or projections, and by providing the opposite walls of the hopper D with spikes or projections, between which the spikes or projections of the cylinder pass, as may be seen from Fig. 3. The hopper D at the left hand of Fig. 1 is the receiving-hopper for wet material to be delivered to the first apron, B, of the series, and its delivery-aperture may be controlled by a sliding gate, $a$, which regulates the thickness of the layer of material taken by the apron. The other hoppers D, into which material is delivered by the aprons B B', are so constructed as to leave a considerable space, $b$, between their upper edge and the apron above them for a purpose hereinafter referred to. The rollers or drums C C' may be geared together and driven in any suitable manner. As here shown, the roller or drum C of each apron has upon its shaft a spur-wheel, $c$, and the shaft of each roller or drum C' carries a similar spur-wheel, $c'$. Each breaking and feeding cylinder E carries upon its shaft a pinion, $d$, which gears into the wheels $c$ $c'$ adjacent to it, and in this way the apron-rollers C C' receive a very slow movement, while the breaking and feeding cylinder E receives a quicker movement.

The apparatus may be driven by a belt on a pulley placed on any one of the shafts of the apparatus, and the motion may be transmitted through the aprons B B', &c., or the rollers or drums C C' of each apron may carry chain or sprocket wheels, and be geared together or connected by an endless chain, such system of gearing and driving being common and well understood.

I have here shown under each apron a coil or system, $e$, of steam-heating pipes supplied by a branch, $e'$, from a common supply-pipe, $e^2$, and from which exhaust-steam passes by a branch, $e^3$, to a common exhaust-pipe, $e^4$. As here shown the rollers C C', aprons B B', &c., and the hoppers D extend entirely across the casing A and divide it into upper and lower portions, which communicate with each other only by the spaces or openings $b$, and below each roller or drum C in advance of the first is a partition, $f$, whereby the space below each apron is separated from that below the next apron.

Below the apparatus above described is a hot-air furnace arranged in a compartment or chamber, F. The hot-air chamber G of this furnace is supplied with fresh air through an inlet-pipe, $g$, and the hot air is delivered through the opening $h$ directly into the chamber F. The fire-pot H of the furnace is fed through an opening or throat, $i$, and the products of combustion escape at $j$.

From the chamber F the dry hot air is conducted by pipes $k$ $k'$ $k^2$ to the chamber A below the several aprons therein, and its chief avenue of escape from below the aprons is through the spaces or openings $b$, where it meets the partly-dried material falling from the several aprons, and so, to a great extent, robs it of moisture. Openings $l$, controlled by valves $l'$, may be provided in the top of the chamber A for the escape of air charged with moisture. From the above description it will be understood that the furnace and the confining of air below the aprons, together with the escape-opening $l$ above the aprons, form a means whereby are produced currents of air through the openings $b$, where the currents meets the falling material and rob it of its moisture.

If desired, the steam-heating pipes $e$ might be arranged between the direct and return portions of each apron instead of below the apron, as here shown.

The material may be delivered at the end of the apparatus into a hopper from which it may be filled into bags or carried away by a conveyer, or it may drop to another floor and there be fed to another and similar apparatus arranged to move the material during its drying operation back to the starting-point, where it may be taken by an elevator and raised and delivered into the supply-hopper D at the left hand of the apparatus shown, thus providing for continuous treatment of the materied to be dried.

I do not claim, broadly, as of my invention a drying apparatus wherein are employed endless aprons arranged to deliver material from one to another; nor do I claim steam-pipes arranged in the chamber or casing which incloses said aprons.

By producing the flow of hot or dry air through the spaces intervening between the head of each endless apron and the tail of the apron next behind I render the air most effective in its operation on the drying material, and by employing a breaking and feeding cylinder and a hopper at the adjacent ends of the two endless aprons I break up or separate the particles of the partly-dried material and prevent agglomeration thereof.

What I claim as my invention, and desire to secure by Letters Patent, is—

1. The combination, with a closed chamber or casing and a series of endless aprons or carriers arranged therein, one in advance of another, as described, for conveying material through said chamber, of means for delivering hot or dry air into said chamber or casing, substantially as and for the purpose herein described.

2. The combination, with a closed chamber or casing and a series of endless aprons or carriers arranged, one in advance of another, as described, of means for producing a current of hot or dry air lengthwise of the apparatus, through the space between the head of each apron and the tail of the apron for delivering material upon it, substantially as and for the purpose herein described.

3. The combination, with a casing or chamber and endless aprons or carriers arranged therein, one in advance of another, as described, the said aprons extending the entire width of the casing or chamber, of means for supplying hot or dry air to the casing or chamber below said aprons, and escape-openings for air in said casing or chamber above said aprons, whereby currents of air will be caused to pass between the overlapping ends of the aprons to intercept the material being delivered from one to another of the aprons, substantially as and for the purpose herein decribed.

4. The combination, with the chamber or casing and the endless aprons arranged therein, as described, the aprons extending the entire width of the chamber, of the partitions $f$, dividing the chamber below the aprons, the escape-openings. $l$ in the chamber above the aprons, and a furnace and pipes for supplying hot air to the chamber below the aprons, substantially as and for the purpose herein described.

5. The combination, with a chamber and endless aprons arranged therein, one in advance of another, as described, of a feeding-hopper at the receiving end or head of each apron, into which material is delivered from the apron next behind, and a breaking and feeding cylinder in each hopper, substantially as and for the purpose herein described.

6. The combination, with a chamber and endless aprons arranged therein, one in advance of another, as described, of a feeding-hopper and its contained breaking and feeding cylinder at the head of each apron, into which material is delivered from the apron next behind, and means for causing currents of hot or dry air to pass lengthwise of the apparatus and across the said hoppers, to intercept the material falling into the hoppers, substantially as and for the purpose herein described.

WRIGHT DURYEA.

Witnesses:
EMIL SCHWARTZ,
FREDK. HAYNES.